(12) United States Patent
Noro et al.

(10) Patent No.: US 12,110,389 B2
(45) Date of Patent: Oct. 8, 2024

(54) FLUIDITY MODIFIER, COMPOSITION CONTAINING SAME, AND CURED PRODUCT OF SAID COMPOSITION

(71) Applicant: DIC Corporation, Tokyo (JP)

(72) Inventors: Daiki Noro, Ichihara (JP); Hiroshi Yoshimura, Ichihara (JP); Junko Yamamoto, Ichihara (JP); Yusuke Tajiri, Ichihara (JP)

(73) Assignee: DIC Corporation, Tokyo (JP)

( * ) Notice: Subject to any disclaimer, the term of this patent is extended or adjusted under 35 U.S.C. 154(b) by 705 days.

(21) Appl. No.: 17/276,597

(22) PCT Filed: Sep. 12, 2019

(86) PCT No.: PCT/JP2019/035855
§ 371 (c)(1),
(2) Date: Mar. 16, 2021

(87) PCT Pub. No.: WO2020/066651
PCT Pub. Date: Apr. 2, 2020

(65) Prior Publication Data
US 2022/0041858 A1    Feb. 10, 2022

(30) Foreign Application Priority Data

Sep. 27, 2018    (JP) ................. 2018-181959

(51) Int. Cl.
  C08L 67/02    (2006.01)
  C08G 63/16    (2006.01)
  C08K 3/013    (2018.01)
  C08K 3/22     (2006.01)
  C08K 3/26     (2006.01)
  C08K 3/34     (2006.01)
  C08K 5/092    (2006.01)
  C08L 81/04    (2006.01)

(52) U.S. Cl.
  CPC ............. *C08L 67/02* (2013.01); *C08G 63/16* (2013.01); *C08K 3/013* (2018.01); *C08K 3/22* (2013.01); *C08K 3/26* (2013.01); *C08K 3/34* (2013.01); *C08K 5/092* (2013.01); *C08L 81/04* (2013.01); *C08K 2003/2262* (2013.01); *C08K 2003/265* (2013.01)

(58) Field of Classification Search
  None
  See application file for complete search history.

(56) References Cited

U.S. PATENT DOCUMENTS

2008/0319123 A1*  12/2008  Haubennestel ........ C08G 63/60
                                                        528/26
2019/0382527 A1   12/2019  Tajiri et al.

FOREIGN PATENT DOCUMENTS

| JP | H4272956 A | * | 9/1992 |
| JP | H11-292961 A | | 10/1999 |
| JP | 2010-150440 A | | 7/2010 |
| JP | 2011-079935 A | | 4/2011 |
| JP | 2013-203857 A | | 10/2013 |
| WO | 2018/116812 A1 | | 6/2018 |

OTHER PUBLICATIONS

Office Action mailed May 26, 2022, issued for Korean patent application No. 10-2021-7005353 and English translation thereof.
International Search Report mailed Dec. 17, 2019, issued for PCT/JP2019/035855.

* cited by examiner

*Primary Examiner* — Satya B Sastri
(74) *Attorney, Agent, or Firm* — Locke Lord LLP; James E. Armstrong, IV; Nicholas J. DiCeglie, Jr.

(57) ABSTRACT

A fluidity modifier for a coating material or the like contains an ester resin represented by the following general formula (I) or general formula (II) (Y represents a hydrogen atom or a monocarboxylic acid residue having 1 to 9 carbon atoms, G represents an aliphatic diol residue having 2 to 9 carbon atoms, A represents an aliphatic dicarboxylic acid residue having 2 to 10 carbon atoms, X represents a dicarboxylic acid residue having 1 to 8 carbon atoms, Z represents a monoalcohol residue having 2 to 10 carbon atoms, n represents the number of repeating units and is an integer of 0 to 30, and m represents the number of repeating units and is an integer of 0 to 30; G and A may be the same or different for each repeating unit, and a plurality of G may be the same as or different from each other).

[Chem. 1]

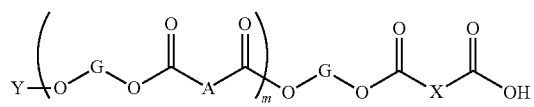

[Chem. 2]

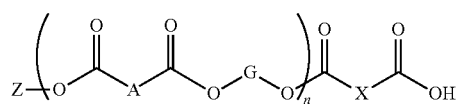

21 Claims, No Drawings

FLUIDITY MODIFIER, COMPOSITION CONTAINING SAME, AND CURED PRODUCT OF SAID COMPOSITION

TECHNICAL FIELD

The present invention relates to a fluidity modifier capable of imparting fluidity particularly when an inorganic filler or the like is mixed with another compound, a composition containing the same, and a cured product of the composition.

BACKGROUND ART

In resin compositions such as sealing materials, coating materials, adhesives, and sealing agents in the related art, a filler (filling agent) containing various inorganic compounds is blended for the purpose of not only increasing the amount but also exhibiting various functions such as gas barrier properties, electrical conductivity, heat insulation properties, and flame retardancy. The filler is not limited to being blended to the resin composition used as a coating material such as the sealing material, and is also blended to a resin composition for molding applications such as an automotive member, a sanitary absorbent article (for example, diaper), a building material, and stone paper for the purpose of improving the durability and the like of an obtained molded article.

Although there are various types and applications of the filler, there are actual conditions that, in any case, when the filler is mixed with a resin, the original fluidity of the resin is often impaired, and when the composition is used for coating or for obtaining a molded article, the workability and the moldability are deteriorated, and the amount of the filler to be used has an upper limit.

For example, in applications such as sealing materials or coating materials that are often used outdoors, since a difference in outside air temperature between summer and winter is large, even when the same sealing materials or coating materials are used, a change in viscosity due to the blending of the filler is large, resulting that the same construction method cannot be adopted, and therefore it is necessary to design, prepare, and store various types in advance, so that there is a problem in that the productivity is poor.

In addition, in molded articles of resin compositions such as automotive members, sanitary absorbent articles, building materials, and stone paper, an increase in a filler filling amount is required for the purpose of further improving the performance of the molded articles. However, when the filler filling amount is increased, there are problems that the fluidity of a composition containing the resin and the filler is decreased and the moldability is decreased.

In view of such a background, for example, various methods, in which the dispersibility in a resin (organic compound) is improved and the viscosity of the composition is decreased by modifying the surface of the inorganic filler using a coupling agent, are proposed. However, there are new problems in that the processing of the inorganic filler, which is originally inexpensive, leads to an increase in cost as a whole, and addition of a modification step of the inorganic filler complicates the preparation of the composition.

As a viscosity-reducing agent or a diluent of a composition containing an additive such as an inorganic filler, use of a hydrocarbon-based solvent such as mineral spirit or paraffin, polyethylene glycol, or glycerin alkyl ester is known, but the viscosity-reducing effect thereof is insufficient, and there is also a problem that the solvent volatilizes into the atmosphere during curing or molding of the composition. As means for solving these problems, for example, it has been proposed to use a dialkyl ether having a specific structure that is less volatile into the atmosphere as the viscosity-reducing agent (see, for example, PTL 1).

However, in recent years, highly functional compositions (coating materials, molding materials, and the like) have been increasingly demanded, and there has been a demand for the development of an additive that has performance equal to or higher than that of the viscosity-reducing agent in the related art when used in a smaller amount, and that can be suitably used as a fluidity modifier.

CITATION LIST

Patent Literature

PTL 1: JP-A-2011-79935

SUMMARY OF INVENTION

Technical Problem

In view of the above circumstances, a problem to be solved by the invention is to provide a fluidity modifier capable of imparting fluidity as a composition (paste) to an inorganic filler, which has high general versatility as a composition particularly for a sealing material, or a coating material, or the like, even when an amount of the fluidity modifier added to the inorganic filler is small, and a composition containing the same.

Another problem to be solved by the invention is to provide a fluidity modifier capable of imparting fluidity as a composition to an inorganic filler, which has high general versatility for being used as a resin composition for molding applications such as automotive members, sanitary absorbent articles, building materials, and stone paper, even when an addition amount of the fluidity modifier is small, a composition containing the same, and a cured product obtained from the composition.

Solution to Problem

As a result of intensive studies, the inventors have found that the above problems can be solved by using one containing an ester resin having a specific structure and having an acid value and a molecular weight in specific ranges. Thus, the invention has been completed.

That is, the invention provides a fluidity modifier containing: an ester resin represented by the following general formula (I)

[Chem. 1]

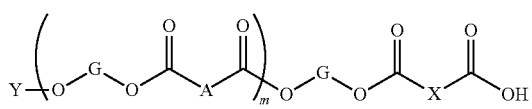

(in the general formula (I), Y represents a hydrogen atom or a monocarboxylic acid residue having 1 to 9 carbon atoms, G represents an aliphatic diol residue having 2 to 9 carbon atoms, A represents an aliphatic dicarboxylic acid residue having 2 to 10 carbon atoms, X represents a dicarboxylic acid residue having 1 to 8 carbon atoms, and m represents the number of repeating units and is an integer of 0 to 30; G and A may be the same or different for each repeating unit, and a plurality of G may be the same as or different from each other), or represented by the following general formula (II)

[Chem. 2]

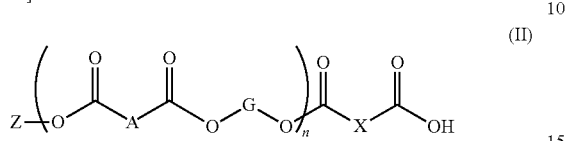

(II)

(in the general formula (II), Z represents a monoalcohol residue having 2 to 10 carbon atoms, G, A, X are the same as defined above, and n represents the number of repeating units and is an integer of 0 to 30; G and A may be the same or different for each repeating unit), in which an acid value is in a range of 3 to 50, and a number average molecular weight is in a range of 300 to 3000, and a composition containing the same.

Advantageous Effects of Invention

According to the invention, it is possible to provide a fluidity modifier containing an ester resin having a specific structure and capable of imparting fluidity when prepared as a composition to an inorganic filler without impairing the performance of an obtained molded article, even when the amount of the fluidity modifier used is small.

DESCRIPTION OF EMBODIMENTS

[Fluidity Modifier]

A fluidity modifier of the invention contains an ester resin represented by the following general formula (I)

[Chem. 3]

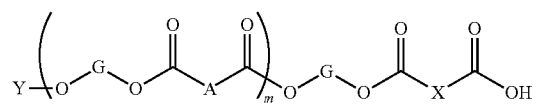

(I)

(in the general formula (I), Y represents a hydrogen atom or a monocarboxylic acid residue having 1 to 9 carbon atoms, G represents an aliphatic diol residue having 2 to 9 carbon atoms, A represents an aliphatic dicarboxylic acid residue having 2 to 10 carbon atoms, X represents a dicarboxylic acid residue having 1 to 8 carbon atoms, and m represents the number of repeating units and is an integer of 0 to 30. G and A may be the same or different for each repeating unit, and a plurality of G may be the same as or different from each other.)

or represented by the following general formula (II)

[Chem. 4]

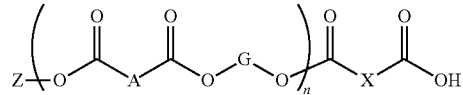

(II)

(in the general formula (II), Z represents a monoalcohol residue having 2 to 10 carbon atoms, G, A, X are the same as defined above, and n represents the number of repeating units and is an integer of 0 to 30. G and A may be the same or different for each repeating unit).

In the invention, the term "carboxylic acid residue" refers to an organic group remaining after the removal of a carboxyl group of a carboxylic acid, and the term "diol residue" or "alcohol residue" refers to an organic group remaining after the removal of a hydroxy group from a diol or an alcohol. Further, when referring to the number of carbon atoms, the number of carbon atoms in the carboxyl group is not included.

It is required that the fluidity modifier in the invention has an acid value in a range of 3 to 50. When the acid value is in this range, the fluidity is effectively exhibited by interaction with an inorganic filler or the like when prepared as a composition (paste). In the invention, the acid value and the hydroxyl value of the fluidity modifier are values obtained according to a measurement method defined in JIS K0070-1992, and the unit is mgKOH/g.

The acid value of the fluidity modifier of the invention is preferably in a range of 3 to 35.

Further, it is required that the fluidity modifier in the invention has a number average molecular weight (Mn) in a range of 300 to 3000. When Mn is within this range, the fluidity modifier does not volatilize when the composition is cured or molded after the composition is prepared, and the fluidity modification is effectively exhibited without adversely influencing the inherent performance of the resin or the inorganic filler. From these viewpoints, Mn is preferably in a range of 400 to 2500, and most preferably in a range of 400 to 1500. Each of m in the general formula (I) and n in the general formula (II) represents the number of repeating units, and is preferably in the range of 0 to 30, and the average value thereof is preferably in a range of 2 to 15. In addition, structures of the repeating units in ( ) are not necessarily the same, and G in ( ) and G outside ( ) may be same as or different from each other in the general formula (I).

In the invention, the molecular weights (Mn, Mw) of the fluidity modifier and the average value of m and n are values measured as follows.

[GPC Measurement Condition]

Measurement apparatus: High speed GPC apparatus "HLC-8320GPC" manufactured by Tosoh Corporation Column: "TSK GURDCOLUMN SuperHZ-L" manufactured by Tosoh Corporation+"TSK gel SuperHZM-M" manufactured by Tosoh Corporation+"TSK gel SuperHZM-M" manufactured by Tosoh Corporation+"TSK gel SuperHZ-2000" manufactured by Tosoh Corporation+"TSK gel SuperHZ-2000" manufactured by Tosoh Corporation Detector: RI (differential refractometer)

Data processing: "EcoSEC Data Analysis version 1.07" manufactured by Tosoh Corporation Column temperature: 40° C.

Developing solvent: tetrahydrofuran

Flow rate: 0.35 mL/min

Measurement sample: measurement sample obtained by dissolving 7.5 mg of a sample in 10 ml of tetrahydrofuran, and filtering a resulting solution through a microfilter.

Sample injection amount: 20 μl

Standard sample: the following monodisperse polystyrene having a known molecular weight measured based on a measurement manual of the "HLC-8320GPC".

(Monodisperse Polystyrene)
"A-300" manufactured by Tosoh Corporation
"A-500" manufactured by Tosoh Corporation
"A-1000" manufactured by Tosoh Corporation
"A-2500" manufactured by Tosoh Corporation
"A-5000" manufactured by Tosoh Corporation
"F-1" manufactured by Tosoh Corporation
"F-2" manufactured by Tosoh Corporation
"F-4" manufactured by Tosoh Corporation
"F-10" manufactured by Tosoh Corporation
"F-20" manufactured by Tosoh Corporation
"F-40" manufactured by Tosoh Corporation
"F-80" manufactured by Tosoh Corporation
"F-128" manufactured by Tosoh Corporation
"F-288" manufactured by Tosoh Corporation Y in the general formula (I) represents a hydrogen atom or a monocarboxylic acid residue having 1 to 9 carbon atoms. The monocarboxylic acid residue may be any residue of an aliphatic monocarboxylic acid, an alicyclic monocarboxylic acid, and an aromatic monocarboxylic acid, and examples thereof include residues of propionic acid, butanoic acid, hexanoic acid, octanoic acid, and octylic acid; and residues of benzoic acid, dimethylbenzoic acid, trimethylbenzoic acid, tetramethylbenzoic acid, ethylbenzoic acid, propylbenzoic acid, butylbenzoic acid, cuminic acid, paratertiary butylbenzoic acid, orthotoluic acid, metatoluic acid, paratoluic acid, ethoxybenzoic acid, propoxybenzoic acid, anisic acid, and naphthoic acid.

Among these, from the viewpoint of a higher fluidity modification effect on the inorganic filler or the like, Y is preferably a hydrogen atom or a residue of benzoic acid.

G in the general formula (I) represents an aliphatic diol residue having 2 to 9 carbon atoms, and may contain an alicyclic structure or an ether bond. Examples of the aliphatic diol residue include residues of ethylene glycol, 1,2-propylene glycol, 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, and the like. Further, G may have an oxyalkylene structure having 4 to 12 carbon atoms, and examples thereof include residues of diethylene glycol, triethylene glycol, tetraethylene glycol, dipropylene glycol, and tripropylene glycol. These may be used alone or in combination of two or more thereof. Among these, from the viewpoint of a compound having an excellent fluidity modification effect when being mixed with the inorganic filler described later, G is preferably a residue of 1,2-propylene glycol, neopentyl glycol, or 1,3-propanediol.

A in the general formula (I) represents an aliphatic dicarboxylic acid residue having 2 to 10 carbon atoms, and may contain an alicyclic structure. By containing an aliphatic dicarboxylic acid-derived structure, the fluidity modification is effectively exhibited to the inorganic filler or the like. Examples of the aliphatic dicarboxylic acid residue include residues of succinic acid, glutaric acid, adipic acid, pimelic acid, suberic acid, azelaic acid, sebacic acid, and 1,2-dicarboxycyclohexane, and these may be used alone or in combination of two or more thereof. Among these, from the viewpoint of the compound having an excellent fluidity modification effect, A is preferably a residue of adipic acid.

X in the general formula (I) represents a dicarboxylic acid residue having 1 to 8 carbon atoms, and examples thereof include a residue of an aliphatic dicarboxylic acid including an alicyclic dicarboxylic acid, and a residue of an aromatic dicarboxylic acid. Examples of the aliphatic dicarboxylic acid residue include residues of malonic acid, succinic acid, glutaric acid, adipic acid, pimelic acid, suberic acid, azelaic acid, sebacic acid, maleic acid, fumaric acid, 1,2-dicarboxycyclohexane, and 1,2-dicarboxycyclohexene. Examples of the aromatic dicarboxylic acid residue include residues of phthalic acid, isophthalic acid, terephthalic acid, 1,4-naphthalenedicarboxylic acid, 2,3-naphthalenedicarboxylic acid, 2,6-naphthalenedicarboxylic acid, 2,7-naphthalenedicarboxylic acid, and 1,8-naphthalenedicarboxylic acid. Among these, from the viewpoint of the compound having an excellent fluidity modification effect, X is preferably a residue of succinic acid, adipic acid, maleic acid, or phthalic acid.

Z in the general formula (II) represents a monoalcohol residue having 2 to 10 carbon atoms, and may contain an alicyclic structure. Examples of the monoalcohol residue include residues of ethanol, propanol, butanol, pentanol, hexanol, cyclohexanol, heptanol, octanol, nonanol, and decanol. Among these, from the viewpoints of the compound having an excellent fluidity modification effect and of easy introduction, Z is preferably a residue of octanol, nonanol, or decanol.

G, A, and X in the general formula (II) are the same as those in the general formula (I), and preferred structures thereof are the same as those in the general formula (I).

In the invention, that is, when the fluidity modifier may contain a mixture of compounds represented by the above general formula (I) or (II) and having different m and n, that is, the numbers of repeating units, or a mixture of compounds having different residues in the general formula (I) or (II) and in the case of a mixture, it is satisfactory as long as the acid value and the number average molecular weight of the mixture are within the ranges specified in the present application. In addition, the fluidity modifier may contain a mixture of a compound represented by the general formula (I) and a compound represented by the general formula (II). Alternatively, another ester-based compound or a part of raw materials may be contained, but it is required that the acid value and the number average molecular weight of the fluidity modifier are within the ranges specified in the present application. When another ester-based compound or a part of raw materials is contained, the content thereof is preferably low, and in particular, is preferably 5 mass % or less.

From the viewpoint of further exhibiting the effects of the invention, in the general formula (I), Y is preferably a hydrogen atom, an acetyl group, or a benzoic acid residue, G is preferably a residue of propylene glycol, neopentyl glycol, or 1,3-propanediol, A is preferably a residue of adipic acid, X is preferably a residue of adipic acid or maleic acid, and in the general formula (II), Z is preferably a residue of octanol, nonanol, or decanol, G is preferably a residue of propylene glycol, neopentyl glycol, or 1,3-propanediol, A is preferably a residue of adipic acid, and X is preferably a residue of adipic acid or maleic acid.

In the invention, from the viewpoint of being capable of further preventing the generation of volatile components during curing or molding in a composition obtained by mixing with the inorganic filler or various resins described later, it is preferable to reduce the content of a low molecular compound, and it is preferable to remove a component in which m or n is 0 or an unreacted raw material in a step such as distillation after the compound is synthesized.

The ester resin in the invention can be produced, for example, by subjecting the raw materials to an esterification reaction, for example, in a temperature range of 180° C. to 250° C. for 10 to 25 hours, if necessary, in the presence of an esterification catalyst. Conditions such as the temperature and the time in the esterification reaction are not particularly limited and may be appropriately set. The monocarboxylic acid or the dicarboxylic acid may be used as the raw material as it is, or an esterified product thereof, an acid chloride thereof, an anhydride of the dicarboxylic acid, or the like may be used as the raw material.

Examples of the esterification catalyst include titanium-based catalysts such as tetraisopropyl titanate and tetrabutyl titanate; tin-based catalysts such as dibutyltin oxide; and organic sulfonic acid-based catalysts such as p-toluenesulfonic acid.

The amount of the esterification catalyst to be used may be appropriately set, and in general, the esterification catalyst is preferably used in a range of 0.001 to 0.1 parts by mass with respect to 100 parts by mass of the total amount of the raw materials.

Properties of the fluidity modifier of the invention vary depending on factors such as the number average molecular weight and a combination of raw materials, but the fluidity modifier generally has properties of liquid, solid, paste, and the like at normal temperature.

More specific examples of the method for producing the ester resin include a method in which the above-described diol, dicarboxylic acid, and monocarboxylic acid are collectively charged and subjected to an esterification reaction, and a method in which a compound having a hydroxy group at the terminal is obtained by using a diol and a dicarboxylic acid, and then the compound is further reacted with a dicarboxylic acid.

In the invention, the above-described fluidity modifier may be used alone and added to the inorganic filler or various synthetic resins described below, or may be used in combination with other additives known as plasticizers, modifiers, and the like in the related art.

Examples of other additives include a modifier other than the compounds represented by the general formulas (I) and (II) of the invention, an ultraviolet absorber, a stabilizer, a deterioration inhibitor (for example, an antioxidant, a peroxide decomposing agent, a radical inhibitor, a metal deactivator, and an acid scavenger), and a dye.

The composition may be prepared by a method in which the fluidity modifier of the invention is mixed in advance with other additives known as plasticizers and modifiers in the related art to prepare an additive, and then the additive is added to the inorganic filler or various synthetic resins.

Examples of the other modifier include ester resins other than the compounds represented by the general formulas (I) and (II), phosphoric acid esters such as triphenyl phosphate (TPP), tricresyl phosphate, and cresyldiphenyl phosphate, phthalic acid esters such as dimethyl phthalate, diethyl phthalate, dibutyl phthalate, and di-2-ethylhexyl phthalate, ethylphthalyl ethyl glycolate, butyl phthalyl butyl glycolate, trimethylolpropane tribenzoate, pentaerythritoltetraacetate, and tributyl acetylcitrate.

The fluidity modifier of the invention has an effect of imparting fluidity to a powder, a powder body, particles, fibers, or the like when the powder, the powder body, the particles, the fibers, or the like is formed into a paste, or is melt-kneaded, and an application range thereof is not particularly limited, and the fluidity modifier of the invention can be particularly suitably used as a modifier of the inorganic filler.

The applicable inorganic filler is not particularly limited, and examples of the applicable inorganic filler include an extender such as calcium carbonate, talc, silica, and clay, antimony oxide, aluminum hydroxide, magnesium hydroxide, hydrotalcite, calcium silicate, magnesium oxide, potassium titanate, barium titanate, titanium oxide, calcium oxide, magnesium oxide, and manganese dioxide. Among these, from the viewpoint of further achieving the effects of the invention, it is preferable to use one or more kinds selected from the group consisting of calcium carbonate, manganese dioxide, and talc.

The shape of the inorganic filler, such as the particle diameter, the fiber length, and the fiber diameter, is not particularly limited, and may be appropriately adjusted depending on the intended applications. Further, a surface treatment state of the inorganic filler is not particularly limited, and the surface may be modified with, for example, a saturated fatty acid depending on the intended applications.

The proportion of the fluidity modifier used when mixing with various inorganic fillers is not particularly limited, and it is preferable to use, for example, 0.1 to 30 parts by mass, and particularly preferable to use 0.1 to 10 parts by mass of the fluidity modifier of the invention with respect to 100 parts by mass of the inorganic filler.

[Composition]

The fluidity modifier of the invention can be suitably used for a pasty resin composition that requires fluidity in use, which is a resin composition containing an inorganic filler such as a sealing material, a coating material, an adhesive, and a sealing agent.

The synthetic resin contained in the pasty resin composition is not particularly limited, and examples thereof include a vinyl chloride-based resin, an acrylic resin, an ethylene-vinyl acetate-based resin, a phenol resin, an alkyd resin, an epoxy resin, a polyurethane resin, a polyester resin, an unsaturated polyester resin, a modified silicone resin, a silicone resin, a modified polysulfide resin, and a polysulfide resin. At this time, with respect to 100 parts by mass of the total amount of the synthetic resin and the inorganic filler, the fluidity modifier of the invention is preferably contained in an amount of 0.1 to 30 parts by mass, and particularly preferably 0.1 to 10 parts by mass.

A method for producing the pasty resin composition is not particularly limited. For example, the inorganic composition and the resin composition of the invention can be produced by a method in which the above components are sufficiently kneaded under reduced pressure or under an inert gas atmosphere such as nitrogen by using a stirring device such as a roll, a kneader, an extruder, a universal agitator, or a blender-mixer to cause uniform dispersion of the components.

The pasty resin composition contains a synthetic resin, but the fluidity modifier of the invention can also be suitably used for a composition containing a viscous compound such as asphalt instead of the synthetic resin.

The fluidity modifier of the invention can prevent an excessive increase in viscosity without impairing the inherent performance of the synthetic resin when the inorganic filler is mixed with the fluidity modifier. From such a viewpoint, it is preferable to apply the fluidity modifier to a coating material, an adhesive, a structural material, or the like which is often used outdoors, and it is preferable to apply the fluidity modifier to a polysulfide-based sealing material having a particularly high filler content, or a structural material for which an increase in the filler content is desired.

(Sealing Material)

A polysulfide-based resin used in the above polysulfide-based sealing material is not particularly limited as long as it is a resin having a sulfide bond in the molecule, and examples thereof include a resin in which a hydrocarbon group such as an alkyl group is bonded to a sulfide bond. The polysulfide resin may have, for example, an ether bond, an ester bond, an amide bond, or an imide group in the skeleton.

When the polysulfide-based resin has an ether bond in the skeleton, the polysulfide-based resin becomes a polysulfide polyether resin. The polysulfide resin may have, for example, a functional group such as a thiol group, a hydroxy group, or an amino group at one terminal or both terminals.

Examples of the polysulfide-based resin include those having a structural unit represented by $-(C_2H_4OCH_2OC_2H_4-Sx)-$ (x is an integer of 1 to 5) in the main chain, and having a thiol group represented by $-C_2H_4OCH_2OC_2H_4-SH$ at the terminal.

The polysulfide-based resin preferably has fluidity at room temperature, specifically at 25° C. The number average molecular weight (Mn) of the polysulfide resin is usually 100 to 200,000, and preferably 400 to 50,000 or less.

Further, examples of the polysulfide-based resin also include a polysulfide polyether resin. Specific examples of the polysulfide polyether resin include a polysulfide polyether resin having a thiol group, for example, a polysulfide polyether resin having a polyether moiety represented by (1) "$-(R_1O)_n$-" ($R_1$ represents an alkylene group having 2 to 4 carbon atoms, and n represents an integer of 6 to 200) and a structural unit represented by (2) "$-C_2H_4OCH_2OC_2H_4$-Sx-" and (3) "$-CH_2CH(OH)CH_2$-Sx-" (x is an integer of 1 to 5) in the main chain, and a thiol group represented by (4) "$-C_2H_4OCH_2OC_2H_4-SH$" or "$-CH_2CH(OH)CH_2-SH$" at the terminal.

The number average molecular weight of the polysulfide polyether resin is usually 600 to 200,000, and preferably 800 to 50,000.

The method for producing the polysulfide-based resin is not limited, and a polysulfide-based resin produced by various known methods can be used. Further, a commercially available product of the polysulfide-based resin can also be used. Examples of the commercially available product of the polysulfide resin include "THIOKOL LP-23, LP-32" (manufactured by Toray Fine Chemical Co., Ltd.) and "THIOPLAST Polymer" (manufactured by AKZO NOBEL). The polysulfide resin (A) may be used alone or a combination of two or more thereof.

Various other additives and the like can be used in combination with the polysulfide-based sealing material containing the fluidity modifier of the invention. Examples of the additive include an adhesion-imparting agent, a pigment, a dye, an anti-aging agent, an antioxidant, an antistatic agent, a flame retardant, a tackifier resin, a stabilizer, and a dispersant.

As the adhesion-imparting agent, for example, a silane coupling agent such as aminosilane is preferred because of being excellent in the effect of improving the adhesiveness to a glass surface and of being a general-purpose compound. Examples of the aminosilane include 3-aminopropyltrimethoxysilane, 3-aminopropyltriethoxysilane, 3-aminopropylmethyldimethoxysilane, 3-aminopropylethyldiethoxysilane, bistrimethoxysilylpropylamine, bistriethoxysilylpropylamine, bismethoxydimethoxysilylpropylamine, bisethoxydiethoxysilylpropylamine, N-2-(aminoethyl)-3-aminopropyltrimethoxysilane, N-2-(aminoethyl)-3-aminopropylmethyldimethoxysilane, N-2-(aminoethyl)-3-aminopropyltriethoxysilane, and N-2-(aminoethyl)-3-aminopropylethyldiethoxysilane.

Examples of the pigment include organic pigments such as an azo pigment and a copper phthalocyanine pigment.

Examples of the dye include a black dye, a yellow dye, a red dye, a blue dye, and a brown dye.

Examples of the anti-aging agent include a hindered phenol compound and a hindered amine compound.

Examples of the antioxidant include butylhydroxytoluene (BHT) and butylhydroxyanisole (BHA).

Examples of the antistatic agent include: quaternary ammonium salts; and hydrophilic compounds such as a polyglycol and an ethylene oxide derivative.

Examples of the flame retardant include a chloroalkyl phosphate, a dimethyl-methyl phosphonate, a bromine-phosphorus compound, an ammonium polyphosphate, a neopentylbromide-polyether, and a brominated polyether.

Examples of the tackifier resin include a terpene resin, a phenol resin, a terpene-phenol resin, a rosin resin, a xylene resin, an epoxy resin, an alkyl titanate, and an organic polyisocyanate.

Examples of the stabilizer include a fatty acid silyl ester and a fatty acid amide trimethylsilyl compound.

The dispersant refers to a substance that forms a solid into fine particles and disperses the fine particles in a liquid, and examples thereof include sodium hexametaphosphate, condensed sodium naphthalene sulfonate, and a surfactant.

The polysulfide-based sealing material is usually used by being mixed with a curing agent immediately before use. As the curing agent, for example, a curing agent generally used for the polysulfide resin sealing material, for example, a metal oxide, a metal peroxide, an organic or inorganic oxidizing agent, an epoxy compound, or an isocyanate compound, can be used. Among these, a metal peroxide such as lead dioxide and manganese dioxide is preferred, and manganese dioxide is more preferred. The fluidity modifier of the invention is preferably used by being mixed with this curing agent.

When manganese dioxide is used as the curing agent, the amount of manganese dioxide to be used is preferably 2.5 to 25 parts by mass, and more preferably 3 to 20 parts by mass with respect to 100 parts by mass of the polysulfide resin used as a main agent, since curing is sufficient and a cured product having appropriate elasticity can be obtained.

The curing agent may contain other fillers, plasticizers, curing accelerators, and silane coupling agents.

When used as the sealing material, a curing condition is usually 20° C. to 25° C. after the main agent and the curing agent are mixed. Further, a curing time is usually 24 to 168 hours.

(Structural Material)

Examples of a resin component contained in the resin composition used for the structural material include a polyolefin, a polyurethane, and an unsaturated polyester.

The resin component of a molding resin composition used for the structural material (building material) varies depending on the intended applications. For example, a polyurethane is mainly used as the resin component when the structural material is a waterproof material, and an unsaturated polyester is mainly used as the resin component when the structural material is an artificial marble.

When the structural material is a waterproof material, the resin composition used for the waterproof material (hereinafter, sometimes simply referred to as "resin composition for waterproof material") is preferably a polyurethane composition containing, for example, a main agent component containing an isocyanate group-containing compound and a curing agent component containing one or more kinds selected from the group consisting of an aromatic polyamine, a polyol, water, and moisture.

The isocyanate group-containing compound contained in the main agent component is preferably an isocyanate group-terminated polyurethane prepolymer obtained by reacting a polyisocyanate having a diphenylmethane diisocyanate structure with a polyol.

Examples of the polyisocyanate include 4,4'-diphenylmethane diisocyanate, 2,4'-diphenylmethane diisocyanate, and 2,2'-diphenylmethane diisocyanate. Among these, an isocyanate mixture containing 4,4'-diphenylmethane diisocyanate and 2,4'-diphenylmethane diisocyanate and/or 2,2'-diphenylmethane diisocyanate is preferred.

The polyol is preferably a polyoxypropylene polyol, and more preferably a polyoxypolypropylene diol used alone or a mixture of a polyoxypropylene diol and a polyoxypropylene triol.

A ratio of the polyisocyanate to the polyol in the isocyanate group-terminated urethane prepolymer is preferably 1.8 to 2.5 in terms of a molar ratio (NCO/OH) of the isocyanate group to the hydroxy group. Further, the content of the isocyanate group (content of NCO group) in the isocyanate group-terminated urethane prepolymer is preferably 2 mass % to 5 mass %.

Examples of the aromatic polyamine contained in the curing agent component include 4,4'-methylenebis(2-chloroaniline), dimethylthiotoluenediamine, and diethyltoluenediamine. Among these, 4,4'-methylenebis(2-chloroaniline) is known as "MOCA" and is widely used.

The polyol contained in the curing agent component is preferably a polyether polyol, and particularly preferably a polyoxypropylene polyol. The number of functional groups of the polyol is preferably 2 to 4, and more preferably 2 to 3.

When the polyurethane is a two-component curing type polyurethane, a mixing ratio of the main agent to the curing agent is, for example, 1.0 to 2.0, preferably 1.0 to 1.8, and more preferably 1.0 to 1.3 in terms of a molar ratio (NCO/($NH_2$+OH)) of the isocyanate group contained in the main agent to an active hydrogen-containing group contained in the curing agent.

The curing agent component may preferably contain an inorganic filler, and examples of the inorganic filler include calcium carbonate, talc, clay, silica, and carbon.

The content of the inorganic filler in the polyurethane composition is, for example, preferably 10 to 60 parts by mass, and more preferably 20 to 50 parts by mass with respect to 100 parts by mass of the resin component. By setting the content of the inorganic filler in the above range, a balance between the curability of the composition and the performance of the obtained waterproof material can be improved.

In the case of the two-component curing type polyurethane, the viscosity of the main agent and the viscosity of the curing agent are usually both high (main agent: for example, 7 Pa·S to 10 Pa·S, curing agent: for example, 10 Pa·S to 30 Pa·S), and the viscosity is further increased in winter during which the temperature is lowered, so that the fluidity modifier of the invention capable of improving the dispersibility of the inorganic filler and improving the content thereof is useful.

The fluidity modifier of the invention is only required to be contained in the resin composition for waterproof material. For example, in the case of the above two-component curing polyurethane, the fluidity modifier of the invention is only required to be contained in at least one of the main agent component and the curing agent component.

In order to promote an urethanization reaction, the curing agent component may contain a known curing catalyst. Examples of the curing catalyst include lead organic acid, tin organic acid, and tertiary amine compounds.

The curing agent component may contain, in addition to the inorganic filler and the curing catalyst, esters such as dioctyl phthalate (bis(2-ethylhexyl) phthalate), dibutyl phthalate, dinonyl phthalate, diisononyl phthalate, dioctyl adipate, methyl ester of lard, methyl ester of bran oil; plasticizers such as chlorinated paraffin and a petroleum-based plasticizer; pigments such as chromium oxide, titanium oxide, and phthalocyanine; and stabilizers such as an antioxidant, an ultraviolet absorber, and a dehydrating agent.

Examples of the waterproof material obtained by molding the composition for waterproof material include a rooftop waterproof material.

The rooftop waterproof material is obtained by, for example, coating a composition, in which a main agent component and a curing agent component are mixed, onto a desired portion to form a coating film, and then subjecting the coating film to a curing reaction.

(Molding Material)

The fluidity modifier of the invention can be used for any resin composition containing an inorganic filler such as talc or calcium carbonate and can also be used for a resin composition for molding such as injection molding or extrusion molding, not limited to the above pasty resin composition. The resin composition for molding containing the fluidity modifier of the invention can prevent an excessive increase in viscosity due to the inclusion of the inorganic filler, and can smoothly perform melt-kneading or the like before molding.

Since the fluidity modifier of the invention can also increase the amount of the inorganic filler added, the fluidity modifier can be suitably used for resin compositions for molding such as automotive members, sanitary absorbent articles, building materials, and stone paper, which are desired to increase the amount of the inorganic filler added to improve physical properties.

The content of the fluidity modifier of the invention in the resin composition for molding is, for example, 0.1 to 30 parts by mass, and preferably 0.1 to 10 parts by mass with respect to 100 parts by mass of the inorganic filler.

Hereinafter, components of the resin composition for molding other than the fluidity modifier in each application will be exemplified, but the components contained in the resin composition for molding are not limited to the following.

(Automotive Member)

Examples of the resin component contained in the resin composition for molding used for automotive members (hereinafter, sometimes simply referred to as "resin composition for automotive members") include thermoplastic resins, and among the thermoplastic resins, a polypropylene resin having excellent moldability, high mechanical strength, economic efficiency, and the like is preferred.

The above polypropylene resin is not particularly limited, and is preferably a polypropylene resin having an MFR (230° C., 2.16 kg) of 60 to 120 g/10 min.

The resin composition for automotive members may further contain an olefin-based thermoplastic elastomer as the resin component. The olefin-based thermoplastic elastomer is not particularly limited, and is preferably an olefin-based thermoplastic elastomer containing an ethylene-α-olefin copolymer.

Examples of the inorganic filler contained in the resin composition for automotive members include talc, calcium carbonate, whiskers (examples of the material of the whiskers include graphite, potassium titanate, alumina, silicon carbide, silicon nitride, mullite, magnesia, magnesium borate, aluminum borate, magnesium sulfate, zinc oxide, and titanium boride), carbon nanofibers, carbon nanotubes, kaolin clay, and mica.

The resin composition for automotive members may contain various additives other than the fluidity modifier of the invention and the inorganic filler, and examples of the additives include an antioxidant, an ultraviolet absorber, a light stabilizer, a flame retardant, and a colorant.

A composition ratio of the resin component, the inorganic filler, the fluidity modifier, and the like contained in the resin composition for automotive members is not particularly limited, and is preferably adjusted to a composition ratio satisfying one or more of the following physical properties.

The MFR (230° C., 2.16 kg, JIS-K7210-1) of the resin composition for automotive members is preferably 20 g/10 min or more, and more preferably 20 to 30 g/10 min.

The linear expansion coefficient (JIS-K7197) of the resin composition for automotive members is preferably $5.0 \times 10^{-5}$/K or less, and more preferably 4.0 to $5.0 \times 10^{-5}$/K.

The tensile elastic modulus (JIS-K7161) of the resin composition for automotive members is preferably 2.5 GPa or more, and more preferably 2.5 to 3.0 GPa.

The charpy impact value (JIS-K7111) of the resin composition for automotive members is preferably 30 kJ/m$^2$ or more, and more preferably 30 to 40 kJ/m$^2$.

Examples of the automotive members obtained by molding the resin composition for automotive members include a bonnet hood, a fender, a bumper, a door, a trunk lid, a roof, a radiator grille, a wheel cap, an instrument panel, and a pillar garnish.

These automotive members can be produced by injection molding the resin composition for automotive members.

(Sanitary Absorbent Article)

Examples of a resin component contained in a resin composition for molding used in the sanitary absorbent article (hereinafter, sometimes simply referred to as "resin composition for sanitary absorbent articles") include polyolefins, and among the polyolefins, one or more kinds selected from the group consisting of a polyethylene and a polypropylene are preferred, and a polyethylene is more preferred.

When a polyethylene is used as the resin component, for example, two or more kinds of polyethylenes having different densities may be used.

The polyolefin used as the resin component of the resin composition for sanitary absorbent articles is not particularly limited, and the MFR (190° C., 2.16 kgf) thereof is preferably 0.1 to 20 g/10 min, and more preferably 0.5 to 5 g/10 min.

When the MFR is set to 0.1 g/10 min or more, the moldability of a thin film can be sufficiently maintained, and when the MFR is set to 20 g/10 min or less, sufficient strength can be obtained.

The resin composition for sanitary absorbent articles may further contain a polystyrene-based elastomer as the resin component.

Examples of the polystyrene-based elastomer include elastomers containing styrene-olefin-based (SEP, SEBC, or the like), styrene-olefin-styrene-based (SEPS, SEBS, or the like), styrene-diene-based (SIS, SBS, or the like), and hydrogenated styrene-diene-based (HSIS, HSBR, or the like) styrene blocks.

A styrene component in these polystyrene-based elastomers is preferably 10 mass % to 40 mass %, and more preferably 20 mass % to 40 mass %.

Examples of the inorganic filler contained in the resin composition for sanitary absorbent articles include calcium carbonate, calcium sulfate, barium carbonate, and titanium oxide, and one or more kinds selected from the group consisting of calcium carbonate and barium sulfate are preferred.

The form of the inorganic filler is not particularly limited, and is preferably in the form of particles, more preferably fine particles having an average particle diameter of 0.1 μm to 10 μm, even more preferably fine particles having an average particle diameter of 0.3 μm to 5 μm, and particularly preferably fine particles having an average particle diameter of 0.5 μm to 3 μm.

The content of the inorganic filler in the resin composition for sanitary absorbent articles is, for example, preferably polyolefin: inorganic filler=60 to 20 parts by mass: 40 to 80 parts by mass, more preferably polyolefin: inorganic filler=55 to 25 parts by mass: 45 to 75 parts by mass, and still more preferably polyolefin: inorganic filler=50 to 30 parts by mass: 50 to 70 parts by mass.

When the content of the inorganic filler is within the above range, it is possible to sufficiently ensure all of the moisture permeability, the air permeability, and the liquid permeability resistance of the obtained sanitary absorbent article.

The resin composition for sanitary absorbent articles may contain various additives other than the fluidity modifier of the invention and the inorganic filler, and examples of the additives include a compatibilizer, a processing aid, an antioxidant, a heat stabilizer, a light stabilizer, an ultraviolet absorber, an antiblocking agent, an antifogging agent, a matting agent, a surfactant, an antibacterial agent, a deodorant, an antistatic agent, a water repellent agent, an oil repellent agent, a radiation shielding agent, a colorant, and a pigment.

A molded article obtained by molding the resin composition for sanitary absorbent articles can be suitably used as a back sheet (a sheet that has air permeability and moisture permeability but does not pass liquid) used in a sanitary absorbent article such as a paper diaper and a sanitary napkin.

The back sheet can be produced, for example, by melt-kneading the resin composition for sanitary absorbent articles, then forming a sheet by a T-die method or an inflation method, and uniaxially or biaxially stretching the obtained sheet.

(Stone Paper)

The stone paper is a sheet containing calcium carbonate derived from limestone and a polyolefin (polyethylene, polypropylene, or the like) and does not require water and wood for forming the sheet, and the limestone as a raw material is present on the earth in an almost unlimited manner, and thus the stone paper is a sheet having excellent sustainability.

The stone paper contains a large amount of calcium carbonate, and since the fluidity of calcium carbonate can be increased by the fluidity modifier of the invention, the sheet physical properties can be increased.

The stone paper can be produced, for example, by melt-kneading a stone paper composition containing, for example, calcium carbonate, a polyolefin, and the fluidity modifier of the invention, and then performing inflation molding or extrusion molding.

In the stone paper composition, the content of calcium carbonate in terms of a mass ratio of polyolefin to calcium carbonate (polyolefin:calcium carbonate) is, for example, 85:15 to 20:80, preferably 85:15 to 30:70, more preferably 85:15 to 35:65, and still more preferably 80:20 to 40:60.

The stone paper composition may further contain a foaming agent, a coloring agent, a lubricant, a coupling agent, a stabilizer (an antioxidant, an ultraviolet absorber, or the like), an antistatic agent, or the like as an auxiliary agent.

Examples of the foaming agent include aliphatic hydrocarbon compounds such as propane, normal butane, isobutane, normal pentane, isopentane, and hexane; alicyclic hydrocarbon compounds such as cyclohexane, cyclopentane, and cyclobutane; and halogenated hydrocarbon compounds such as trifluoromonochloroethane and difluorodichloromethane.

Examples of the lubricant include fatty acid-based lubricants such as stearic acid, hydroxystearic acid, composite stearic acid, and oleic acid; aliphatic alcohol-based lubricants; aliphatic amide-based lubricants such as stearoamide, oxystearoamide, oleylamide, erucylamide, ricinolamide, behenamide, methylolamide, methylenebisstearoamide, methylenebisstearobehenamide, bisamide acid of higher fatty acid, and composite amide; aliphatic ester-based lubricants such as n-butyl stearate, methyl hydroxystearate, polyhydric alcohol fatty acid ester, saturated fatty acid ester, and ester-based wax; and fatty acid metal soap-based lubricants.

Examples of the antioxidant include a phosphorus-based antioxidant, a phenol-based antioxidant, and a pentaerythritol-based antioxidant.

Examples of the phosphorus-based antioxidant include phosphite esters such as triesters, diesters, and monoesters of phosphorous acid such as triphenyl phosphite, trisnonylphenyl phosphite, and tris(2,4-di-tert-butylphenyl) phosphite; and phosphate esters such as trimethyl phosphate, triethyl phosphate, tributyl phosphate, trioctyl phosphate, triphenyl phosphate, tricresyl phosphate, tris(nonylphenyl) phosphate, and 2-ethylphenyldiphenyl phosphate.

Examples of the phenol-based antioxidant include α-tocopherol, butylhydroxytoluene, sinapyl alcohol, vitamin E, n-octadecyl-3-(3,5-di-tert-butyl-4-hydroxyphenyl) propionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl) phenol, 3,5-di-tert-butyl-4-hydroxybenzylphosphonate diethyl ester, and tetrakis[3-(3,5-di-tert-butyl-4-hydroxyphenyl)propionyloxy methyl] methane.

EXAMPLES

Hereinafter, the invention will be described in more detail with reference to Examples. In the Examples, "part" and "%" are based on mass unless otherwise specified.

Synthesis Example 1

To a four-necked flask having a capacity of 2 L and equipped with a thermometer, a stirrer, and a reflux condenser, 459.3 g of 1,3-butanediol, 48.7 g of neopentyl glycol, 616.2 g of adipic acid, and 0.112 g of tetraisopropyl titanate as an esterification catalyst were charged, and the materials were subjected to a condensation reaction for 10 hours in total by increasing the temperature stepwise to 220° C. while stirring under a nitrogen stream. After the reaction, 0.056 g of hydroquinone and 44.2 g of maleic anhydride were charged at 150° C. to complete the reaction, thereby obtaining an ester resin (1) having an acid value of 29.1, a hydroxyl value of 121, and a number average molecular weight of 900.

Synthesis Example 2

To a four-necked flask having a capacity of 2 L and equipped with a thermometer, a stirrer, and a reflux condenser, 239.7 g of propylene glycol, 219.2 g of adipic acid, 366.4 g of benzoic acid, and 0.078 g of tetraisopropyl titanate as an esterification catalyst were charged, and the materials were subjected to a condensation reaction for 11 hours in total by increasing the temperature stepwise to 230° C. while stirring under a nitrogen stream. After the reaction, the unreacted propylene glycol was removed at 180° C. under reduced pressure, thereby obtaining an ester resin (2) having an acid value of 4.7, a hydroxyl value of 8.8, and a number average molecular weight of 430.

Synthesis Example 3

To a four-necked flask having a capacity of 2 L and equipped with a thermometer, a stirrer, and a reflux condenser, 479.4 g of propylene glycol, 730.7 g of adipic acid, 244.2 g of benzoic acid, and 0.138 g of tetraisopropyl titanate as an esterification catalyst were charged, and the materials were subjected to a condensation reaction for 13 hours in total by increasing the temperature stepwise to 230° C. while stirring under a nitrogen stream. After the reaction, the unreacted propylene glycol was removed at 180° C. under reduced pressure, thereby obtaining an ester resin (3) having an acid value of 7.9, a hydroxyl value of 18.6, and a number average molecular weight of 950.

Synthesis Example 4

To a four-necked flask having a capacity of 0.3 L and equipped with a thermometer, a stirrer, and a reflux condenser, 200.0 g of the ester resin (1) obtained by Synthesis Example 1 and 52.4 g of acetic anhydride were charged, and the mixture was subjected to a reaction at 120° C. for 6 hours in total while stirring under a nitrogen stream, thereby obtaining an ester resin (4) having an acid value of 27.1, a hydroxyl value of 12.6, and a number average molecular weight of 1200.

Synthesis Example 5

To a four-necked flask having a capacity of 3 L and equipped with a thermometer, a stirrer, and a reflux condenser, 913.1 g of propylene glycol, 584.6 g of adipic acid, 977.0 g of benzoic acid, and 0.235 g of tetraisopropyl titanate as an esterification catalyst were charged, and the materials were subjected to a condensation reaction for 10 hours in total by increasing the temperature stepwise to 230° C. while stirring under a nitrogen stream. After the reaction, the unreacted propylene glycol was removed at 150° C. under reduced pressure, and then 172.8 g of phthalic anhydride was charged at 110° C. to complete the reaction, thereby obtaining an ester resin (5) having an acid value of 30.0, a hydroxyl value of 74.3, and a number average molecular weight of 400.

Synthesis Example 6

To a four-necked flask having a capacity of 3 L and equipped with a thermometer, a stirrer, and a reflux condenser, 913.1 g of propylene glycol, 584.6 g of adipic acid, 977.0 g of benzoic acid, and 0.235 g of tetraisopropyl titanate as an esterification catalyst were charged, and the materials were subjected to a condensation reaction for 10 hours in total by increasing the temperature stepwise to 230° C. while stirring under a nitrogen stream. After the reaction, the unreacted propylene glycol was removed at 150° C. under reduced pressure, and then 116.6 g of succinic anhydride was charged at 110° C. to complete the reaction, thereby obtaining an ester resin (6) having an acid value of 30.2, a hydroxyl value of 82.4, and a number average molecular weight of 400.

Synthesis Example 7

To a four-necked flask having a capacity of 2 L and equipped with a thermometer, a stirrer, and a reflux condenser, 494.6 g of propylene glycol, 380.0 g of adipic acid, 635.0 g of benzoic acid, and 0.143 g of tetraisopropyl titanate as an esterification catalyst were charged, and the materials were subjected to a condensation reaction for 10 hours in total by increasing the temperature stepwise to 230° C. while stirring under a nitrogen stream. After the reaction, the unreacted propylene glycol was removed at 160° C. under reduced pressure, and then 0.056 g of hydroquinone and 68.9 g of maleic anhydride were charged at 110° C. to complete the reaction, thereby obtaining an ester resin (7) having an acid value of 36.4, a hydroxyl value of 40.5, and a number average molecular weight of 450.

Synthesis Example 8

To a four-necked flask having a capacity of 3 L and equipped with a thermometer, a stirrer, and a reflux condenser, 913.1 g of propylene glycol, 584.6 g of adipic acid, 977.0 g of benzoic acid, and 0.235 g of tetraisopropyl titanate as an esterification catalyst were charged, and the materials were subjected to a condensation reaction for 10 hours in total by increasing the temperature stepwise to 230° C. while stirring under a nitrogen stream. After the reaction, the unreacted propylene glycol was removed at 150° C. under reduced pressure, and then 0.094 g of hydroquinone and 114.1 g of maleic anhydride were charged at 110° C. to complete the reaction, thereby obtaining an ester resin (8) having an acid value of 30.1, a hydroxyl value of 83.4, and a number average molecular weight of 400.

Synthesis Example 9

To a four-necked flask having a capacity of 3 L and equipped with a thermometer, a stirrer, and a reflux condenser, 1027.2 g of propylene glycol, 1096.1 g of adipic acid, 366.4 g of benzoic acid, and 0.237 g of tetraisopropyl titanate as an esterification catalyst were charged, and the materials were subjected to a condensation reaction for 11 hours in total by increasing the temperature stepwise to 230° C. while stirring under a nitrogen stream. After the reaction, the unreacted propylene glycol was removed at 150° C. under reduced pressure, and then 0.096 g of hydroquinone and 117.5 g of maleic anhydride were charged at 110° C. to complete the reaction, thereby obtaining an ester resin (9) having an acid value of 35.6, a hydroxyl value of 90.7, and a number average molecular weight of 600.

Synthesis Example 10

To a four-necked flask having a capacity of 2 L and equipped with a thermometer, a stirrer, and a reflux condenser, 380.5 g of propylene glycol, 292.3 g of adipic acid, 488.5 g of benzoic acid, and 0.110 g of tetraisopropyl titanate as an esterification catalyst were charged, and the materials were subjected to a condensation reaction for 10 hours in total by increasing the temperature stepwise to 230° C. while stirring under a nitrogen stream. After the reaction, the unreacted propylene glycol was removed at 190° C. under reduced pressure, thereby obtaining an ester resin (10) having an acid value of 0.06, a hydroxyl value of 25.8, and a number average molecular weight of 500.

Synthesis Example 11

To a four-necked flask having a capacity of 2 L and equipped with a thermometer, a stirrer, and a reflux condenser, 312.8 g of propylene glycol, 261.6 g of adipic acid, 436.0 g of benzoic acid, and 0.097 g of tetraisopropyl titanate as an esterification catalyst were charged, and the materials were subjected to a condensation reaction for 10 hours in total by increasing the temperature stepwise to 230° C. while stirring under a nitrogen stream. After the reaction, the unreacted propylene glycol was removed at 190° C. under reduced pressure, thereby obtaining an ester resin (11) having an acid value of 0.50, a hydroxyl value of 12.6, and a number average molecular weight of 450.

Synthesis Example 12

To a four-necked flask having a capacity of 2 L and equipped with a thermometer, a stirrer, and a reflux condenser, 287.8 g of propylene glycol, 438.4 g of adipic acid, 146.6 g of benzoic acid, and 0.054 g of tetraisopropyl titanate as an esterification catalyst were charged, and the materials were subjected to a condensation reaction for 25 hours in total by increasing the temperature stepwise to 230° C. while stirring under a nitrogen stream. After the reaction, the unreacted propylene glycol was removed at 200° C. under reduced pressure, thereby obtaining an ester resin (12) having an acid value of 0.5, a hydroxyl value of 5.5, and a number average molecular weight of 1090.

Synthesis Example 13

To a four-necked flask having a capacity of 2 L and equipped with a thermometer, a stirrer, and a reflux condenser, 479.4 g of propylene glycol, 740.5 g of phthalic acid, 244.2 g of benzoic acid, and 0.139 g of tetraisopropyl titanate as an esterification catalyst were charged, and the materials were subjected to a condensation reaction for 19 hours in total by increasing the temperature stepwise to 230° C. while stirring under a nitrogen stream. After the reaction, the unreacted propylene glycol was removed at 190° C. under reduced pressure, thereby obtaining an ester resin (13) having an acid value of 3.6, a hydroxyl value of 17.5, and a number average molecular weight of 700.

Synthesis Example 14

To a four-necked flask having a capacity of 2 L and equipped with a thermometer, a stirrer, and a reflux condenser, 410.0 g of 1,3-butanediol, 828.0 g of adipic acid, and 0.074 g of tetraisopropyl titanate as an esterification catalyst were charged, and the materials were subjected to a condensation reaction for 22 hours in total by increasing the temperature stepwise to 220° C. while stirring under a nitrogen stream, thereby obtaining an ester resin (14) having an acid value of 112.6, a hydroxyl value of 1>, and a number average molecular weight of 1070.

Synthesis Example 15

To a four-necked flask having a capacity of 2 L and equipped with a thermometer, a stirrer, and a reflux condenser, 505.9 g of 1,3-butanediol, 688.5 g of adipic acid, and 0.072 g of tetraisopropyl titanate as an esterification catalyst were charged, and the materials were subjected to a condensation reaction for 22 hours in total by increasing the temperature stepwise to 220° C. while stirring under a nitrogen stream, thereby obtaining an ester resin (15) having an acid value of 1>, a hydroxyl value of 105.3, and a number average molecular weight of 1320.

Synthesis Example 16

To a four-necked flask having a capacity of 2 L and equipped with a thermometer, a stirrer, and a reflux condenser, 300.0 g of the ester resin (14) and 700.0 g of the ester resin (15) were charged, and the materials were stirred at 90° C., thereby obtaining an ester resin (16) having an acid value of 34.2, a hydroxyl value of 72.7, and a number average molecular weight of 1240.

Example 1

According to formulations shown in Table 1, 65 g of calcium carbonate (NCC #410, manufactured by NITTO FUNKA KOGYO K.K.) as an inorganic filler, 3 g of the ester resin obtained above, and 32 g of PB-10 (benzoic acid ester-based plasticizer, manufactured by DIC Corporation) as a plasticizer were used and uniformly stirred by using a blending mixer (chemistirrer) to obtain an inorganic composition (paste). The obtained inorganic composition was evaluated in the following manner. Results are shown in Table 1.

<Viscosity Measurement>

Measurement was performed by using a rheometer Anton Paar MCR302.

Measurement temperature: 25° C.

The value of a shear rate 1 [1/s] when the shear rate was changed from 0 to 10 [1/s] over 2 minutes was read as the viscosity value.

<Evaluation of Fluidity: Visual Observation>

In a 50 cc vial bottle, 12 g of a sample was measured and left overnight at 25° C., and then a time during which the sample was flowing due to tilting at 135° was measured.
A: Up to 5 cm within 10 seconds
B: Up to 5 cm in 11 to 30 seconds
C: Up to 5 cm in 31 to 50 seconds
D: Up to 5 cm in 50 seconds or longer
E: No movement Examples 2 to 8

Inorganic compositions were obtained in the same manner as in Example 1 by using compounding materials and amounts shown in Table 1. Evaluation was performed in the same manner as in Example 1. Results are shown in Table 1.

TABLE 1

| | Example | | | | | | | |
|---|---|---|---|---|---|---|---|---|
| | 1 | 2 | 3 | 4 | 5 | 6 | 7 | 8 |
| PB-10 | 32 | 32 | 32 | 32 | 32 | 32 | 32 | 32 |
| Ester resin (1) | 3 | | | | | | | |
| Ester resin (2) | | 3 | | | | | | |
| Ester resin (3) | | | 3 | | | | | |
| Ester resin (4) | | | | 3 | | | | |
| Ester resin (6) | | | | | 3 | | | |
| Ester resin (7) | | | | | | 3 | | |
| Ester resin (8) | | | | | | | 3 | |
| Ester resin (9) | | | | | | | | 3 |
| n-hexyl ether | | | | | | | | |
| Mineral spirit | | | | | | | | |
| Fluidity (visual observation) | B | D | A | A | D | D | C | B |
| Viscosity (Pa · s) | 30 | 47 | 29 | 24 | 56 | 43 | 42 | 33 |

Comparative Examples 1 to 10

Inorganic compositions were obtained in the same manner as in Example 1 by using compounding materials and amounts shown in Table 2. Evaluation was performed in the same manner as in Example 1. Results are shown in Table 2. In the evaluation of the viscosity, "-" indicates that the measurement cannot be performed since the inorganic composition was phase-separated.

TABLE 2

| | Comparative Example | | | | | | | | | |
|---|---|---|---|---|---|---|---|---|---|---|
| | 1 | 2 | 3 | 4 | 5 | 6 | 7 | 8 | 9 | 10 |
| PB-10 | 32 | 32 | 32 | 32 | 32 | 32 | 32 | 32 | 32 | 32 |
| Ester resin (10) | | 3 | | | | | | | | |
| Ester resin (11) | | | 3 | | | | | | | |
| Ester resin (12) | | | | 3 | | | | | | |
| Ester resin (13) | | | | | 3 | | | | | |
| Ester resin (14) | | | | | | 3 | | | | |
| Ester resin (15) | | | | | | | 3 | | | |
| Ester resin (16) | | | | | | | | 3 | | |
| n-hexyl ether | | | | | | | | | 3 | |
| Mineral spirit | | | | | | | | | | 3 |
| Fluidity (visual observation) | E | E | E | E | E | E | E | E | E | E |
| Viscosity (Pa · s) | 85 | 100< | 89 | 69 | 100< | 100< | 100< | 100< | — | — |

Example 9

An inorganic composition was obtained in the same manner as in Example 1 by using 25 g of manganese dioxide (Type FA manufactured by Honeywell Co., Ltd., monoclinic sodium vernesite type manganese dioxide), 25 g of calcium carbonate (NCC #410), 3 g of the ester resin (1), and 37.3 g of PB-10 as inorganic fillers according to the compounding shown in Table 3, and the fluidity thereof was evaluated. Results are shown in Table 3.

Examples 10 and 11

Inorganic compositions were obtained in the same manner as in Example 9 by using compounding materials and amounts shown in Table 3. Evaluation was performed in the same manner as in Example 9. Results are shown in Table 3.

TABLE 3

|  | Example | | |
| --- | --- | --- | --- |
|  | 9 | 10 | 11 |
| PB-10 | 37.3 | 37.3 | 37.3 |
| Ester resin (1) | 3 | | |
| Ester resin (3) | | 3 | |
| Ester resin (5) | | | 3 |
| Fluidity (visual observation) | B | A | B |

Comparative Examples 11 and 12

Inorganic compositions were obtained in the same manner as in Example 9 by using compounding materials and amounts shown in Table 4. Evaluation was performed in the same manner as in Example 9. Results are shown in Table 4.

TABLE 4

|  | Comparative Example | |
| --- | --- | --- |
|  | 11 | 12 |
| PB-10 | 40 | 37.3 |
| Ester resin (13) |  | 3 |
| Fluidity (visual observation) | E | E |

Examples 12 and 13

A curing agent for a polysulfide-based sealing material was prepared. Specifically, 10 g of manganese dioxide (Type FA, manufactured by Honeywell Co., Ltd.), 13 g of a plasticizer (W-83, manufactured by DIC Corporation), 0.5 g of a curing accelerator (tetramethylthiuram disulfide), 5 g of heavy calcium carbonate (NCC #410, manufactured by NITTO FUNKA KOGYO K.K.), 0.5 g of SR—F carbon (Asahi #50UG (SR—F)), and 0.9 g of a fluidity modifier were used and uniformly stirred by using a blending mixer (chemistirrer). The viscosity of the obtained curing agent was measured by a rheometer. In addition, the obtained curing agent was mixed with the following main agent, and the curability and the adhesiveness were evaluated in the following manner in accordance with a method described in JIS A 1439. Results are shown in Table 5.

<Preparation of Main Agent>

A main agent for a polysulfide-based sealing material was prepared. Specifically, 100 g of a polysulfide polymer (LP-23 manufactured by Toray Fine Chemical Co., Ltd.), 38.5 g of a plasticizer (PB-10 manufactured by DIC Corporation), 65 g of precipitated calcium carbonate (HAKUENKA CC manufactured by SHIRAISHI CALCIUM KAISHA LTD.), 90 g of heavy calcium carbonate (whiten SSB red manufactured by SHIRAISHI CALCIUM KAISHA LTD.), and 1.5 g of a silane coupling agent (KBM-403 manufactured by Shin-Etsu Chemical Co., Ltd.) were used and uniformly stirred using a blending mixer (chemistirrer) to obtain a main agent.

<Curability Evaluation>

The curability was evaluated according to the method described in JIS A 1439, and the hardness of a sealant 7 days after curing under an atmosphere of 23° C. and 55% RH was measured. A Shore A hardness of 50 or more was evaluated as A, and a Shore A hardness of 49 or less was evaluated as F.

<Adhesiveness Evaluation>

The adhesiveness was evaluated by performing a tensile adhesion test on an H-shaped tensile piece that was cured under an atmosphere of 23° C. and 55% RH for 7 days in accordance with the method described in JIS A 1439. A failure state (cohesive failure/interfacial failure) of the sealant after the test was observed, and cohesive failure of 80% or more was evaluated as A, and cohesive failure of 79% or less was evaluated as F.

Comparative Example 13

A curing agent for a polysulfide-based sealing material according to the compounding described in Table 5 was prepared. The viscosity was measured with a rheometer. The obtained curing agent was mixed with the main agent, and the curability and the adhesiveness were evaluated in the following manner in accordance with the method described in JIS A 1439. Results are shown in Table 5.

TABLE 5

|  | Example | | Comparative Example |
| --- | --- | --- | --- |
|  | 11 | 12 | 13 |
| W-83 | 13 | 13 | 13 |
| Ester resin (1) | 0.9 | | |
| Ester resin (3) | | 0.9 | |
| Viscosity (Pa · s) | 47 | 120 | 639 |
| Curability | A | A | A |
| Adhesiveness | A | A | A |

Example 14

Into a batch-type kneader ("LABO PLASTOMILL 4C150" manufactured by Toyo Seiki Seisaku-sho, Ltd.), 10.8 g of calcium carbonate (heavy calcium carbonate, "Super S" manufactured by Maruo Calcium Co., Ltd.) as an inorganic filler, 36 g of polyethylene ("UMERIT 2040F" manufactured by Ube Industries, Ltd.), and 0.72 g of the ester resin (1) obtained above as an additive were charged and melt-kneaded at a set temperature of 190° C., a blade rotation speed of 50 r/min, and a kneading time of 10 minutes to prepare a resin composition.

The torque value and the internal temperature during melt-kneading were evaluated. Results are shown in Table 6.

The torque value and the internal temperature are values obtained by reading indication values of the kneader at a kneading time of 8 minutes.

Example 15 and Comparative Examples 14 and 15

Resin compositions were prepared and evaluated in the same manner as in Example 14 except that additives shown in Table 6 were used instead of the ester resin (1). Results are shown in Table 6.

The hardened castor oil used in Comparative Example 14 is "HCO-3" manufactured by KF TRADING CO., LTD.

TABLE 6

|  |  | Example 14 | Example 15 | Comparative Example 14 | Comparative Example 15 |
|---|---|---|---|---|---|
| Compounding [g] | Calcium carbonate | 10.8 | 10.8 | 10.8 | 10.8 |
|  | Polyethylene | 36 | 36 | 36 | 36 |
|  | Additive Calcium stearate |  |  | 0.72 |  |
|  | Hardened castor oil |  |  |  | 0.72 |
|  | Ester resin (1) | 0.72 |  |  |  |
|  | Ester resin (3) |  | 0.72 |  |  |
| Torque value [N · m] |  | 8 | 8 | 15 | 14 |
| Internal temperature [° C.] |  | 172 | 172 | 177 | 175 |

Example 16

Into a batch-type kneader ("LABO PLASTOMILL 4C150" manufactured by Toyo Seiki Seisaku-sho, Ltd.), 10.8 g of calcium carbonate ("RL217" manufactured by FUJI TALC INDUSTRIAL CO., LTD.) as an inorganic filler, 36 g of polypropylene (homopolymer of polypropylene, "J106G" manufactured by Prime Polymer Co., Ltd.), and 0.72 g of the ester resin (1) obtained above as an additive were charged and melt-kneaded at a set temperature of 190° C., a blade rotation speed of 50 r/min, and a kneading time of 8 minutes to prepare a resin composition.

The torque value and the internal temperature during the melt-kneading were evaluated. Results are shown in Table 7.

The torque value and the internal temperature are values obtained by reading indication values of the kneader when the kneading was completed.

Example 17 and Comparative Examples 16 and 17

Resin compositions were prepared and evaluated in the same manner as in Example 16 except that additives shown in Table 7 were used instead of the ester resin (1). Results are shown in Table 7.

TABLE 7

|  |  | Example 16 | Example 17 | Comparative Example 16 | Comparative Example 17 |
|---|---|---|---|---|---|
| Compounding [g] | Calcium carbonate | 10.8 | 10.8 | 10.8 | 10.8 |
|  | Polypropylene | 36 | 36 | 36 | 36 |
|  | Additive PB-10 |  |  |  | 0.72 |
|  | Ester resin (1) | 0.72 |  |  |  |
|  | Ester resin (3) |  | 0.72 |  |  |
| Torque value [N · m] |  | 7 | 6.5 | 8.5 | 8 |
| Internal temperature [° C.] |  | 172 | 173 | 173 | 172 |

The invention claimed is:

1. An inorganic composition comprising:
an inorganic filler; and
an inorganic filler fluidity modifier, wherein
the inorganic filler fluidity modifier is an ester resin represented by the following general formula (I)

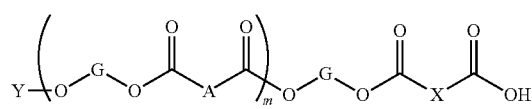
(I)

wherein, in the general formula (I),
Y represents a hydrogen atom or a monocarboxylic acid residue having 1 to 9 carbon atoms,
G represents an aliphatic diol residue having 2 to 9 carbon atoms and the aliphatic diol is one or more selected from ethylene glycol, 1,2-propylene glycol, 1,3-propanediol, 1,2-butanediol, 1,3-butanediol, 2-methyl-1,3-propanediol, 1,4-butanediol, 1,5-pentanediol, 2,2-dimethyl-1,3-propanediol, 2,2-diethyl-1,3-propanediol, 2-n-butyl-2-ethyl-1,3-propanediol, 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, triethylene glycol, tetraethylene glycol, and tripropylene glycol,
A represents an aliphatic dicarboxylic acid residue having 2 to 10 carbon atoms, X represents a dicarboxylic acid residue having 1 to 8 carbon atoms, and m represents the number of repeating units and is an integer of 3 to 30;

G and A may be the same or different from each repeating unit, and a plurality of G may be the same as or different from each other, or represented by the following general formula (II)

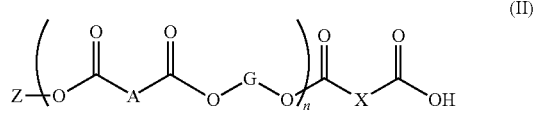

wherein, in the general formula (II),

Z represents a monoalcohol residue having 2 to 10 carbon atoms,

G, A, X are the same as defined above, and n represents the number of repeating units and is an integer of 3 to 30, G and A may be the same or different for each repeating unit, wherein the inorganic filler fluidity modifier has an acid value is in a range of 3 to 50, and a number average molecular weight is in a range of 300 to 3000, and wherein the inorganic filler fluidity modifier is contained in an amount of 0.1 to 30 parts by mass with respect to 100 parts by mass of the inorganic filler.

2. The inorganic composition according to claim 1, wherein the inorganic filler fluidity modifier is an ester resin represented by the general formula (I), and wherein in the general formula (I), Y is a hydrogen atom or a monocarboxylic acid residue having 1 to 6 carbon atoms, G is an aliphatic diol residue having 3 to 5 carbon atoms and the aliphatic diol is one or more selected from ethylene glycol, 1,2-propylene glycol, 1,3-propanediol, 1,2-butanediol, 1,3-butanediol, 2-methyl-1,3-propanediol, 1,4-butanediol, 1,5-pentanediol, and 2,2-dimethyl-1,3-propanediol, A is an aliphatic dicarboxylic acid residue having 2 to 6 carbon atoms, and X is a dicarboxylic acid residue having 2 to 6 carbon atoms.

3. The inorganic composition according to claim 1, wherein the inorganic filler fluidity modifier is an ester resin represented by the general formula (II), and wherein in the general formula (II), Z is a monoalcohol residue having 4 to 10 carbon atoms, A is an aliphatic dicarboxylic acid residue having 2 to 6 carbon atoms, G is an aliphatic diol residue having 3 to 5 carbon atoms and the aliphatic diol is one or more selected from ethylene glycol, 1,2-propylene glycol, 1,3-propanediol, 1,2-butanediol, 1,3-butanediol, 2-methyl-1,3-propanediol, 1,4-butanediol, 1,5-pentanediol, and 2,2-dimethyl-1,3-propanediol, and X is a dicarboxylic acid residue having 2 to 6 carbon atoms.

4. The inorganic composition according to claim 1, wherein the acid value is in a range of 3 to 35.

5. The inorganic composition according to claim 1, wherein the inorganic filler is selected from the group consisting of calcium carbonate, manganese dioxide, talc, and mixtures thereof.

6. The inorganic composition according to claim 1, wherein the inorganic composition is a curing agent for a polysulfide-based sealing material.

7. A resin composition comprising:

a synthetic resin; and the inorganic composition according to claim 1.

8. The resin composition according to claim 7, further comprising:

a plasticizer.

9. The resin composition according to claim 7, wherein the synthetic resin is one or more selected from the group consisting of polysulfide resin, vinyl chloride-based resin, modified polysulfide resin, silicone resin, modified silicone resin, acrylic urethane resin, epoxy resin, polyurethane resin, acrylic resin, polyester resin, unsaturated polyester resin, and polyolefin resin.

10. An additive comprising:

a plasticizer; and the inorganic composition according to claim 1.

11. A cured product of the resin composition according to claim 7.

12. A building material, an automotive member or a sanitary absorbent article, comprising:

the cured product according to claim 11.

13. A stone paper comprising:

the cured product according to claim 11.

14. The inorganic composition according to claim 2, wherein the acid value is in a range of 3 to 35.

15. The inorganic composition according to claim 2, wherein the inorganic filler is selected from the group consisting of calcium carbonate, manganese dioxide, talc, and mixtures thereof.

16. The inorganic composition according to claim 2, wherein the inorganic composition is a curing agent for a polysulfide-based sealing material.

17. A resin composition comprising:

a synthetic resin; and the inorganic composition according to claim 2.

18. A resin composition comprising:

a synthetic resin; and the inorganic composition according to claim 3.

19. The inorganic composition according to claim 3, wherein the acid value is in a range of 3 to 35.

20. The inorganic composition according to claim 3, wherein the inorganic filler is selected from the group consisting of calcium carbonate, manganese dioxide, talc, and mixtures thereof.

21. The inorganic composition according to claim 3, wherein the inorganic composition is a curing agent for a polysulfide-based sealing material.

* * * * *